United States Patent
Murakami et al.

(10) Patent No.: US 12,351,672 B2
(45) Date of Patent: *Jul. 8, 2025

(54) CHLORINATED VINYL-CHLORIDE-BASED RESIN

(71) Applicants: SEKISUI CHEMICAL CO., LTD., Osaka (JP); TOKUYAMA SEKISUI CO., LTD., Osaka (JP)

(72) Inventors: Kento Murakami, Yamaguchi (JP); Norikazu Mashino, Yamaguchi (JP); Isao Higuchi, Osaka (JP); Yasunari Kusaka, Osaka (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 732 days.

This patent is subject to a terminal disclaimer.

(21) Appl. No.: 17/434,509

(22) PCT Filed: Mar. 27, 2020

(86) PCT No.: PCT/JP2020/014257
§ 371 (c)(1),
(2) Date: Aug. 27, 2021

(87) PCT Pub. No.: WO2020/203862
PCT Pub. Date: Oct. 8, 2020

(65) Prior Publication Data
US 2022/0127390 A1    Apr. 28, 2022

(30) Foreign Application Priority Data
Mar. 29, 2019 (JP) ................................. 2019-068509

(51) Int. Cl.
*C08F 8/22* (2006.01)
*C08F 114/06* (2006.01)

(52) U.S. Cl.
CPC .............. *C08F 8/22* (2013.01); *C08F 114/06* (2013.01)

(58) Field of Classification Search
None
See application file for complete search history.

(56) References Cited

U.S. PATENT DOCUMENTS

| 10,000,634 | B2 * | 6/2018 | Matsumura ............ C08K 3/014 |
| 2010/0063247 | A1 | 3/2010 | Sanni et al. |
| 2016/0200893 | A1 | 7/2016 | Matsumura et al. |
| 2016/0208072 | A1 | 7/2016 | Matsumura et al. |
| 2017/0008981 | A1 | 1/2017 | Matsumura et al. |
| 2017/0183491 | A1 | 6/2017 | Matsumura et al. |
| 2022/0127390 | A1 | 4/2022 | Murakami et al. |
| 2022/0135783 | A1 | 5/2022 | Murakami et al. |

FOREIGN PATENT DOCUMENTS

| JP | 10-38807 | 2/1998 |
| JP | 2006-328166 | 12/2006 |
| JP | 2007-246852 | 9/2007 |
| JP | 2008-31265 | 2/2008 |
| WO | 2008/062526 | 5/2008 |
| WO | 2014/178362 | 11/2014 |
| WO | 2015/046454 | 4/2015 |
| WO | 2015/046456 | 4/2015 |
| WO | 2015/152260 | 10/2015 |
| WO | 2016/013638 | 1/2016 |
| WO | 2020/203862 | 10/2020 |

OTHER PUBLICATIONS

International Search Report issued Jun. 9, 2020 in International (PCT) Application No. PCT/JP2020/014257.
International Search Report issued Jun. 16, 2020 in International (PCT) Application No. PCT/JP2020/014192.
International Search Report issued Jun. 16, 2020 in International (PCT) Application No. PCT/JP2020/014197.

* cited by examiner

*Primary Examiner* — Sanza L. McClendon
(74) *Attorney, Agent, or Firm* — WENDEROTH, LIND & PONACK, L.L.P.

(57) ABSTRACT

The present invention provides a chlorinated polyvinyl chloride resin that enables excellent continuous productivity in molding and that enables a molded article to have both processability and unevenness-preventing properties. Provided is a chlorinated polyvinyl chloride resin having an average of a ratio (A/B) of a peak intensity A observed in a range of 660 to 700 $cm^{-1}$ to a peak intensity B observed in a range of 600 to 650 $cm^{-1}$ of 0.50 to 2.00 in Raman imaging measurement by Raman spectroscopy.

12 Claims, No Drawings

CHLORINATED VINYL-CHLORIDE-BASED RESIN

TECHNICAL FIELD

The present invention relates to a chlorinated polyvinyl chloride resin that enables excellent continuous productivity in molding and that enables a molded article to have both processability and unevenness-preventing properties.

BACKGROUND ART

Polyvinyl chlorides generally have excellent mechanical strength, weather resistance, and chemical resistance, and thus have been processed into various molded articles and used in various fields.

Polyvinyl chlorides, however, have poor heat resistance. This has led to the development of chlorinated polyvinyl chloride resins (CPVCs), which are polyvinyl chlorides chlorinated to have improved heat resistance.

For example, Patent Literature 1 discloses a chlorinated polyvinyl chloride resin obtained by a specific production method. Patent Literature 1 discloses that such a resin has less initial discoloration in thermal molding and has excellent thermal stability.

CITATION LIST

Patent Literature

Patent Literature 1: WO 2014/178362

SUMMARY OF INVENTION

Technical Problem

However, the chlorinated polyvinyl chloride resin disclosed in Patent Literature 1 contains many highly chlorinated portions, and thus is easily decomposed by heat in molding and generates a large amount of hydrogen chloride gas, contaminating the die surface. In addition, molded articles obtained in such a manner may have scorch marks, and thus may cause poor continuous productivity in molding and poor molding processability. Moreover, the chlorinated polyvinyl chloride resin may not provide a uniform molded article because the highly chlorinated portions are difficult to uniformly mix with less chlorinated portions due to their difference in melt viscosity, thus causing great shape unevenness in the resulting molded article.

In view of the technical problems in the prior art, the present invention aims to provide a chlorinated polyvinyl chloride resin that enables excellent continuous productivity in molding and that enables a molded article to have both processability and unevenness-preventing properties.

Solution to Problem

The present invention relates to a chlorinated polyvinyl chloride resin having an average of a ratio (A/B) of a peak intensity A observed in a range of 660 to 700 $cm^{-1}$ to a peak intensity B observed in a range of 600 to 650 $cm^{-1}$ of 0.50 to 2.00 in Raman imaging measurement by Raman spectroscopy.

The present invention is described in detail below.

The chlorinated polyvinyl chloride resin of the present invention has an average of a ratio (A/B) of a peak intensity A observed in a range of 660 to 700 $cm^{-1}$ to a peak intensity B observed in a range of 600 to 650 $cm^{-1}$ of 0.50 to 2.00 in Raman imaging measurement by Raman spectroscopy.

The chlorinated polyvinyl chloride resin having an average of the A/B within the above range can improve the unevenness-preventing properties of a molded article and provide excellent continuous productivity in molding.

The lower limit of the average is preferably 0.80, more preferably 1.30, and the upper limit thereof is preferably 1.80, more preferably 1.70.

The average of the ratio (A/B) of the peak intensity A to the peak intensity B can be calculated by measuring Raman spectra using a micro-Raman spectrometer.

Specifically, the chlorinated polyvinyl chloride resin in a powdery form is molded into a sheet having a thickness of 0.5 mm using a vacuum press. The obtained sheet is cut using a microtome, and the obtained cross section is subjected to Raman imaging measurement using a micro-Raman spectrometer. The obtained Raman imaging spectrum is baseline-corrected by linear approximation. The peak intensity B observed in the range of 600 to 650 $cm^{-1}$ and the peak intensity A observed in the range of 660 to 700 $cm^{-1}$ are measured, and the A/B is calculated. The average concerning the peak intensities of 20,000 points is calculated to determine the average.

In the chlorinated polyvinyl chloride resin of the present invention, a standard deviation of the ratio (A/B) of the peak intensity A observed in the range of 660 to 700 $cm^{-1}$ to the peak intensity B observed in the range of 600 to 650 $cm^{-1}$ is preferably less than 0.100 in Raman measurement by Raman spectroscopy.

The chlorinated polyvinyl chloride resin having a standard deviation of the A/B of less than 0.100 can further improve the unevenness-preventing properties of a molded article and continuous productivity in molding.

The standard deviation of the ratio (A/B) of the peak intensity A to the peak intensity B can be calculated based on the peak intensity ratio obtained in the above Raman imaging measurement, for example. Alternatively, the standard deviation can also be measured as follows. Raman spectra of 50 particles of the chlorinated polyvinyl chloride resin in a powdery form are measured using a micro-Raman spectrometer. The obtained Raman spectra are baseline-corrected by linear approximation, and the peak intensity B and the peak intensity A are measured. The standard deviation can be calculated based on the A/B and the average thereof.

The lower limit of the standard deviation of the A/B is preferably 0.010, more preferably 0.015. The upper limit thereof is more preferably 0.095, still more preferably 0.085.

The Raman spectrum analysis of the chlorinated polyvinyl chloride resin also provided the following findings.

Specifically, the intensity of a peak derived from the CH stretching of $CH_2$, observed at 2,921 $cm^{-1}$, and the intensity of a peak observed at 2,977 $cm^{-1}$ varied depending on the method for producing the chlorinated polyvinyl chloride resin. Detailed analysis of these peaks will allow more detailed analysis of structural differences in chlorinated polyvinyl chloride resins.

The analysis also revealed that a photo-chlorinated polyvinyl chloride resin has a peak at 1,600 to 1,700 $cm^{-1}$ that is presumably derived from a double bond, and that a chlorinated polyvinyl chloride resin deteriorated by heating or the like has newly formed peaks at 1,131 $cm^{-1}$ and 1,510 $cm^{-1}$ that are presumably derived from conjugated double bonds.

In the chlorinated polyvinyl chloride resin of the present invention, the average of the A/B and the standard deviation of the A/B preferably satisfy the following relation (1).

$$0.500 \leq [\text{Average of } A/B] + [\text{Standard deviation of } A/B]^{1/2} \leq 2.300 \quad (1)$$

When the above relation is satisfied, the unevenness-preventing properties of a molded article can be improved, and excellent continuous productivity in molding can be achieved.

The lower limit of the above range is more preferably 1.100 and the upper limit thereof is more preferably 2.100.

Preferably, the chlorinated polyvinyl chloride resin of the present invention contains structural units (a) to (c) represented by the following formulas (a) to (c), and the proportion of the structural unit (a) is 5.0 mol % or higher, the proportion of the structural unit (b) is 40.0 mol % or lower, and the proportion of the structural unit (c) is 55.0 mol % or lower, relative to the total number of moles of the structural units (a), (b), and (c). Such a chlorinated polyvinyl chloride resin shows uniform gelling characteristics in melt kneading and can provide a molded article with less unevenness on the surface.

In the chlorinated polyvinyl chloride resin of the present invention, the proportion of the structural unit (a) is preferably 5.0 mol % or higher, more preferably 30.0 mol % or higher, still more preferably 35.0 mol % or higher, and preferably 90.0 mol % or lower, more preferably 60.0 mol % or lower, relative to the total number of moles of structural units (a), (b), and (c).

The proportion of the structural unit (b) is preferably 5.0 mol % or higher, more preferably 15.0 mol % or higher, and preferably 40.0 mol % or lower, more preferably 30.0 mol % or lower, still more preferably 25.0 mol % or lower, relative to the total number of moles of structural units (a), (b), and (c).

The proportion of the structural unit (c) is preferably 5.0 mol % or higher, more preferably 25.0 mol % or higher, and preferably 55.0 mol % or lower, more preferably 40.0 mol % or lower, relative to the total number of moles of structural units (a), (b), and (c).

[Chem. 1]

—CH$_2$—CHCl—      (a)

—CH$_2$—CCl$_2$—      (b)

—CHCl—CHCl—      (c)

The molar ratios of the structural units (a), (b), and (c) in the chlorinated polyvinyl chloride resin reflect the site to which chlorine is introduced at the time of chlorination of the polyvinyl chloride (PVC). The PVC prior to chlorination is in a state where the proportion of the structural unit (a) is 100 mol %, and the proportions of the structural units (b) and (C) are 0 mol %. As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride resin. An increase in this nonuniformity causes variations in gelling characteristics in melt kneading of the chlorinated polyvinyl chloride resin, which will severely impair the smoothness of the molded article surface.

In contrast, in the present invention, setting the molar ratios of the structural units (a), (b), and (c) within the above range enables the chlorinated polyvinyl chloride resin to have high uniformity and exhibit good gelling characteristics in melt kneading.

The molar ratios of the structural units (a), (b), and (c) in the chlorinated polyvinyl chloride resin of the present invention can be measured by molecular structure analysis using NMR. NMR analysis can be performed in accordance with the method described in R. A. Komoroski, R. G. Parker, J. P. Shocker, Macromolecules, 1985, 18, 1257-1265.

The chlorinated polyvinyl chloride resin of the present invention may contain a different structural unit other than the structural units (a), (b), and (c) as long as the effects of the present invention are not impaired.

The amount of the different structural unit is preferably 0% by mass or more, and preferably less than 10% by mass.

In the chlorinated polyvinyl chloride resin of the present invention, the proportion of the structural unit (a) and the average of the A/B preferably satisfy the following relation.

$$2.5 \leq [\text{Proportion (mol \%) of structural unit } (a)] / [\text{Average of } A/B] \leq 200$$

When the above relation is satisfied, the unevenness-preventing properties of a molded article can be improved, and excellent continuous productivity in molding can be achieved.

The lower limit of the above range is more preferably 15 and the upper limit thereof is more preferably 42.

In the chlorinated polyvinyl chloride resin of the present invention, the amount of added chlorine is preferably 3.3 to 15.3% by mass.

When the amount of added chlorine is 3.3% by mass or more, the molded article has sufficient heat resistance. When the amount of added chlorine is 15.3% by mass or less, moldability is improved.

The amount of added chlorine is more preferably 5.3% by mass or more, still more preferably 8.2% by mass or more, and is more preferably 12.3% by mass or less, still more preferably 11.2% by mass or less.

A polyvinyl chloride typically has a chlorine content of 56.8% by mass. The amount of added chlorine means the proportion of chlorine introduced to a polyvinyl chloride, and can be measured by the method specified in JIS K 7229.

In the chlorinated polyvinyl chloride resin of the present invention, the ratio of the amount of added chlorine to the proportion of the structural unit (a) (Amount of added chlorine/Proportion of structural unit (a)) is preferably 0.01 or higher, more preferably 0.15 or higher, and is preferably 1 or lower, more preferably 0.61 or lower.

To prevent unevenness and scorch marks of a molded article, in the chlorinated polyvinyl chloride resin of the present invention, the ratio of the proportion of the structural unit (b) to the proportion of the structural unit (c) (Proportion of structural unit (b)/Proportion of structural unit (c)) is preferably 0.1 or higher, more preferably 0.6 or higher, and is preferably 1.0 or lower, more preferably 0.9 or lower.

In the chlorinated polyvinyl chloride resin of the present invention, the amount of added chlorine and the average of the A/B preferably satisfy the following relation.

$$1.7 \leq [\text{Amount of added chlorine (\% by mass)}] / [\text{Average of } A/B] \leq 30.6$$

When the above relation is satisfied, the unevenness-preventing properties of a molded article can be improved, and excellent continuous productivity in molding can be achieved.

The lower limit of the above range is more preferably 6.5 and the upper limit thereof is more preferably 9.0.

In the chlorinated polyvinyl chloride resin of the present invention, the average of the A/B, the standard deviation, and the amount of added chlorine preferably satisfy the following relation.

$$1.6 \leq -\text{Log}[\text{Standard deviation} \times (\text{Average of } A/B)/ \text{Amount of added chlorine}] \leq 4.3$$

When the above relation is satisfied, excellent continuous productivity in molding can be achieved.

The lower limit of the above range is more preferably 1.7 and the upper limit thereof is more preferably 4.25.

Here, the "Log" in the above specification means the common logarithm with base 10.

The average degree of polymerization of the chlorinated polyvinyl chloride resin of the present invention is not limited, and is preferably 400 or higher, more preferably 500 or higher, and preferably 2,000 or lower, more preferably 1,500 or lower.

When the average degree of polymerization is within the above range, fluidity in injection and the strength of the molded article can be both achieved.

The chlorinated polyvinyl chloride resin of the present invention is a resin obtained by the chlorination of a polyvinyl chloride.

The polyvinyl chloride used may be a vinyl chloride homopolymer, or may be a copolymer of a vinyl chloride monomer and a monomer with unsaturated bond(s) that is copolymerizable with the vinyl chloride monomer, a graft copolymer obtained by graft-copolymerizing a vinyl chloride monomer to a polymer, or the like. These polymers may be used singly or in combinations of two or more.

When the polyvinyl chloride is a copolymer of a vinyl chloride monomer and a monomer with unsaturated bond(s) that is copolymerizable with the vinyl chloride monomer, or a graft copolymer obtained by graft-copolymerizing a vinyl chloride monomer to a polymer, the amount of a component derived from the vinyl chloride monomer in the polyvinyl chloride is preferably 90% by mass or more and preferably 100% by mass or less.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene. Examples of the vinyl esters include vinyl acetate and vinyl propionate. Examples of the vinyl ethers include butyl vinyl ether and cetyl vinyl ether.

Examples of the (meth)acrylates include methyl (meth) acrylate, ethyl (meth)acrylate, butyl acrylate, and phenyl methacrylate. Examples of the aromatic vinyls include styrene and α-methyl styrene.

Examples of the vinyl halides include vinylidene chloride and vinylidene fluoride. Examples of the N-substituted maleimides include N-phenyl maleimide and N-cyclohexyl maleimide.

Preferred among these are ethylene and vinyl acetate.

The polymer to which vinyl chloride is graft copolymerized is not limited as long as vinyl chloride can be graft copolymerized. Examples of such a polymer include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers. Examples also include acrylonitrile-butadiene copolymers, polyurethane, chlorinated polyethylene, and chlorinated polypropylene. These may be used singly or in combination of two or more.

The method of polymerizing the polyvinyl chloride is not limited, and a conventionally known method such as aqueous suspension polymerization, block polymerization, solution polymerization, or emulsion polymerization can be used.

The chlorinated polyvinyl chloride resin of the present invention may be produced by, for example, a method including preparing a suspension in a reaction vessel by suspending a polyvinyl chloride in an aqueous medium, introducing chlorine into the reaction vessel, and heating the suspension to chlorinate the polyvinyl chloride.

The average of the ratio (A/B) of the peak intensity A to the peak intensity B can be adjusted by changing conditions for the polyvinyl chloride chlorination such as pressure, temperature, chlorine concentration, hydrogen peroxide concentration, chlorine consumption rate, and stirring conditions.

The reaction vessel used may be a commonly used vessel such as a glass-lined stainless steel reaction vessel or titanium reaction vessel, for example.

The method of preparing the suspension of the polyvinyl chloride in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

While the gauge pressure in the reaction vessel is not limited, it is preferably from 0 to 2 MPa, because the higher the chlorine pressure is, the more readily the chlorine will penetrate into the PVC particles.

The method of chlorinating the PVC in the suspended state is not limited. Examples of chlorination method include a method in which the excitation of bonding of the PVC and chlorine is brought about by thermal energy to accelerate the chlorination (hereinafter referred to as thermal chlorination). The heating method in the chlorination by thermal energy is not limited, and for example, heating with an external jacket from the reactor wall is effective.

The thermal chlorination method allows more uniform chlorination reaction, which can provide a highly uniform CPVC. The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

The heating temperature in the thermal chlorination is preferably in the range of 40° C. to 120° C. When the temperature is excessively low, the rate of chlorination will decrease. When the temperature is excessively high, dehydrochlorination reaction will occur along with the chlorination reaction, which causes discoloration of the resulting CPVC. The heating temperature is more preferably 50° C. to 110° C. The heating method is not limited, and heating may be performed with an external jacket from the reaction vessel wall, for example.

In the chlorination, hydrogen peroxide is preferably further added to the suspension. The addition of hydrogen peroxide can improve the rate of chlorination. Hydrogen peroxide is preferably added in an amount of 5 to 500 ppm to the PVC per hour of the reaction time. When the amount of hydrogen peroxide added is excessively small, the effect of improving the rate of chlorination cannot be obtained. When the amount of hydrogen peroxide added is excessively large, the thermal stability of the CPVC will decrease.

When hydrogen peroxide is added as described above, the rate of chlorination is improved, so that the heating temperature can be set relatively low. The heating temperature may be 65° C. to 110° C., for example.

During the chlorination, it is preferred to perform chlorination at a chlorine consumption rate of 0.010 to 0.015 kg/PVC-kg·5 min after the amount of added chlorine reaches a value that is five percentage points by mass lower than the final amount of added chlorine, and further perform chlorination at a chlorine consumption rate of 0.005 to 0.010 kg/PVC-kg·5 min after the amount of added chlorine reaches a value that is three percentage points by mass lower than the final amount of added chlorine. As used herein, the term "chlorine consumption rate" refers to the amount of chlorine consumed in 5 minutes per kilogram of the raw material PVC.

When chlorination is performed using the above method, a CPVC having less nonuniformity in the chlorinated state and having excellent thermal stability can be obtained.

In the above chlorination method, preferably, the chlorination is performed while the suspension is stirred. The suspension is stirred preferably under such conditions that the ratio of the vortex volume (unit: L) to the total mass (kg) of the raw material PVC and water is 0.009 to 0.143 (L/kg).

When the ratio is 0.009 (L/kg) or higher, chlorine in the gas phase in the reaction vessel can be sufficiently taken in the liquid phase. When the ratio is 0.143 (L/kg) or lower, the chlorine taken in the liquid phase is less likely to be re-released into the gas phase, allowing uniform chlorination.

The vortex volume means the volume of a vortex formed at the liquid-gas interface during stirring. For example, the vortex volume can be calculated using thermal fluid and powder analysis software "R-FLOW" (produced by R-flow Corporation Ltd.).

Specifically, the vortex volume can be calculated based on the distance between the center of the stirring blade and the interface between the gas phase and the liquid phase in stirring. Here, the stirring blade, which is the stirring power, produces pressure in the liquid and sets the liquid phase at a positive pressure and the gas phase at a negative pressure. This makes it possible to determine the interface between the gas phase and the liquid phase as the border between the positive pressure and the negative pressure.

The stirring blade rotation rate in stirring is preferably 10 to 500 rpm. The capacity of the reaction vessel is preferably 0.01 m$^3$ to 100 m$^3$.

In addition to the above stirring conditions, the chlorination is preferably performed under such conditions that the ratio of the total mass (kg) of the raw material PVC and water to the volume (unit: L) of the reaction vessel is 0.490 to 0.700 (kg/L).

When the ratio is 0.490 (kg/L) or higher, the diffusion of chlorine into the raw material PVC can be sufficiently promoted. When the ratio is 0.700 (kg/L) or lower, unevenness in the diffusion of chlorine into the raw material PVC can be reduced, allowing more uniform chlorination.

The height of the stirring blade is preferably adjusted such that the ratio of the distance from the liquid surface to the stirring blade to the height of the liquid surface (Distance from liquid surface to stirring blade/Height of liquid surface) in stirring is 0.05 to 0.70 (m/m). The height of the liquid surface means the distance from the bottom of the reaction vessel to the raw material liquid surface when the raw material is fed into the reaction vessel. The distance from the liquid surface to the stirring blade means the distance from the liquid surface to the uppermost portion of the stirring blade.

The ratio of the stirring blade diameter to the reaction vessel diameter (Stirring blade diameter/Reaction vessel diameter) is preferably 0.3 (m/m) or higher and preferably 0.9 (m/m) or lower.

In the chlorination method, the concentration of the chlorine introduced into the reaction vessel is preferably 99.5% or higher.

A molded article can be produced by molding a resin composition for molding containing the chlorinated polyvinyl chloride resin of the present invention.

The present invention also encompasses a resin composition for molding containing the chlorinated polyvinyl chloride resin of the present invention.

The lower limit of the amount of the chlorinated polyvinyl chloride resin of the present invention in the resin composition for molding of the present invention is preferably 65% by mass, more preferably 70% by mass and the upper limit thereof is preferably 96% by mass, more preferably 93% by mass.

The resin composition for molding of the present invention may optionally contain additives such as stabilizers, lubricants, processing aids, impact modifiers, heat resistance improvers, antioxidants, ultraviolet absorbents, light stabilizers, fillers, thermoplastic elastomers, and pigments.

Examples of the stabilizers include, but are not limited to, thermal stabilizers and thermal stabilization aids. Examples of the thermal stabilizers include, but are not limited to, organotin stabilizers, lead stabilizers, calcium-zinc stabilizers, barium-zinc stabilizers, and barium-cadmium stabilizers.

Examples of the organotin stabilizers include dibutyl tin mercapto, dioctyl tin mercapto, dimethyl tin mercapto, dibutyl tin mercapto, dibutyl tin maleate, dibutyl tin maleate polymers, dioctyl tin maleate, dioctyl tin maleate polymers, dibutyl tin laurate, and dibutyl tin laurate polymers.

Examples of the lead stabilizers include lead stearate, dibasic lead phosphite, and tribasic lead sulfate. These may be used singly or in combination of two or more thereof.

Examples of the thermal stabilization aids include, but are not limited to, epoxidized soybean oil, phosphate, polyol, hydrotalcite, and zeolite. These may be used singly or in combination of two or more thereof.

Examples of the lubricants include internal lubricants and external lubricants.

The internal lubricants are used to reduce the fluid viscosity of the molten resin in molding to prevent the generation of frictional heat. Examples of the internal lubricants include, but are not limited to, butyl stearate, lauryl alcohol, stearyl alcohol, epoxidized soybean oil, glycerol monostearate, stearic acid, and bisamide. These may be used singly or in combinations of two or more.

The external lubricants are used to improve the slip effect between metal surfaces and the molten resin in molding. Examples of the external lubricants include, but are not limited to, paraffin wax, polyolefin waxes, ester waxes, and montanic acid wax. These may be used singly or in combinations of two or more.

Examples of the processing aids include, but are not limited to, acrylic processing aids such as alkyl acrylate-alkyl methacrylate copolymers having a mass average molecular weight of 100,000 to 2,000,000. Examples of the acrylic processing aids include, but are not limited to, n-butyl acrylate-methyl methacrylate copolymers and 2-ethylhexyl acrylate-methyl methacrylate-butyl methacrylate copolymers. These may be used singly or in combination of two or more thereof.

Examples of the impact modifiers include, but are not limited to, methyl methacrylate-butadiene-styrene copolymers (MBS), chlorinated polyethylene, and acrylic rubber.

Examples of the heat resistance improvers include, but are not limited to, α-methylstyrene resins and N-phenylmaleimide resins.

Examples of the antioxidants include, but are not limited to, phenolic antioxidants.

Examples of the light stabilizers include, but are not limited to, hindered amine light stabilizers.

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the fillers include, but are not limited to, calcium carbonate and talc.

Examples of the pigments include, but are not limited to, organic pigments such as azo pigments, phthalocyanine pigments, threne pigments, and dye lake pigments; and inorganic pigments such as oxide pigments, molybdenum chromate pigments, sulfide/selenide pigments, and ferrocyanide pigments.

Further, a molded article molded from the resin composition for molding of the present invention is provided. The present invention also encompasses such a molded article.

The molding method may be any conventionally known molding method, for example, extrusion molding or injection molding.

The molded article of the present invention has excellent thermal stability and good appearance. The molded article of the present invention can therefore be suitably used in applications such as building components, plumbing materials and equipment, and housing materials.

In the molded article of the present invention, the lower limit of the developed interfacial area ratio (Sdr) is preferably 0.0001 and the upper limit thereof is preferably 0.003. This allows the molded article to have a uniform surface.

The Sdr can be measured using a 3D measurement system (produced by Keyence Corporation, VR-3100), for example.

The molded article of the present invention preferably has a surface roughness (Rmax) of 1.0 μm or less.

The molded article of the present invention preferably has a filtered waviness center line average (WcA) at an outer surface of 5.0 μm or less. Such a molded article has less surface unevenness and less thickness variations. In the present invention, the filtered waviness center line average as well as the surface roughness is low, which allows the molded article to have less friction with flowing water and to increase the flow rate when used as a pipe or the like.

The surface roughness (Rmax) can be measured by a method in accordance with JIS B 0601. The filtered waviness center line average (WcA) can be measured by a method in accordance with JIS B 0610.

Advantageous Effects of Invention

The present invention can provide a chlorinated polyvinyl chloride resin that enables excellent continuous productivity in molding and that enables a molded article to have both processability and unevenness-preventing properties.

DESCRIPTION OF EMBODIMENTS

The present invention is hereinafter described in more detail with reference to examples; however, the present invention should not be limited to these examples.

Example 1

A glass-lined reaction vessel having an inner capacity of 300 L was charged with 130 kg of ion-exchanged water and 50 kg of a polyvinyl chloride having an average degree of polymerization of 1,000. They were stirred to disperse the polyvinyl chloride in water to prepare an aqueous suspension, and then the inside of the reaction vessel was heated to raise the temperature of the aqueous suspension to 100° C. Subsequently, the inside of the reaction vessel was depressurized to remove oxygen (oxygen content 100 ppm). Thereafter, while stirring was performed with a stirring blade such that the vortex formed at the liquid-gas interface by stirring had a vortex volume of 8.1 L, chlorine (oxygen content 50 ppm) was introduced at a partial pressure of chlorine of 0.40 MPa, thereby starting thermal chlorination. At this time, the height of the stirring blade was adjusted such that the ratio of the distance from liquid surface to the stirring blade to the height of the liquid surface (Distance from liquid surface to stirring blade/Height of liquid surface) was 0.386 (m/m). The ratio of the stirring blade diameter to the reaction vessel diameter (Stirring blade diameter/Reaction vessel diameter) was 0.60 (m/m).

Then, the chlorination temperature was kept at 100° C. and the partial pressure of chlorine was kept at 0.40 MPa. After the amount of added chlorine reached 4.2% by mass, addition of a 200 ppm hydrogen peroxide solution was started at 15 ppm/hr in terms of hydrogen peroxide relative to the polyvinyl chloride, and the average chlorine consumption rate was adjusted to 0.02 kg/PVC-kg·5 min. Thereafter, when the amount of added chlorine reached 10.6% by mass, the supply of hydrogen peroxide solution and chlorine gas was terminated, whereby chlorination was terminated.

Subsequently, unreacted chlorine was removed by nitrogen gas aeration, and the obtained chlorinated polyvinyl chloride resin slurry was neutralized with sodium hydroxide, washed with water, dehydrated, and then dried. Thus, a powdery, thermally chlorinated polyvinyl chloride resin (amount of added chlorine: 10.6% by mass) was obtained.

Example 2

A glass-lined reaction vessel having an inner capacity of 300 L was charged with 130 kg of ion-exchanged water and 50 kg of a polyvinyl chloride having an average degree of polymerization of 1,000. They were stirred to disperse the polyvinyl chloride in water to prepare an aqueous suspension, and then the inside of the reaction vessel was heated to raise the temperature of the aqueous suspension to 70° C. Subsequently, the inside of the reaction vessel was depressurized to remove oxygen (oxygen content 100 ppm). Thereafter, while stirring was performed with a stirring blade such that the vortex formed at the liquid-gas interface by stirring had a vortex volume of 2.2 L, chlorine (oxygen content 50 ppm) was introduced at a partial pressure of chlorine of 0.04 MPa. The suspension was then irradiated with ultraviolet light having a wavelength of 365 nm at an irradiation intensity of 350 W using a high-pressure mercury lamp, thereby starting chlorination reaction. At this time, the height of the stirring blade was adjusted such that the ratio of the distance from liquid surface to the stirring blade to the height of the liquid surface (Distance from liquid surface to stirring blade/Height of liquid surface) was 0.133 (m/m). The ratio of the stirring blade diameter to the reaction vessel diameter (Stirring blade diameter/Reaction vessel diameter) was 0.60 (m/m).

Then, the chlorination temperature was kept at 70° C., the partial pressure of chlorine was kept at 0.04 MPa, and the average chlorine consumption rate was adjusted to 0.02 kg/PVC-kg·5 min. When the amount of added chlorine reached 10.6% by mass, the ultraviolet irradiation using the high-pressure mercury lamp and the chlorine gas supply were terminated, whereby chlorination was terminated.

Subsequently, unreacted chlorine was removed by nitrogen gas aeration, and the obtained chlorinated polyvinyl chloride resin slurry was neutralized with sodium hydroxide, washed with water, dehydrated, and then dried. Thus, a powdery, photo-chlorinated polyvinyl chloride resin (amount of added chlorine: 10.6% by mass) was obtained.

Examples 3 to 17 and Comparative Examples 1 to 7

Chlorinated polyvinyl chloride resins were obtained as in Example 1 except that the volume of the reaction vessel, the average degree of polymerization of the polyvinyl chloride, the charge amount, the amount of the ion-exchanged water, the reaction temperature, the vortex volume in stirring, the Distance from liquid surface to stirring blade/Height of liquid surface, and the amount of 200 ppm hydrogen peroxide added were changed as shown in Tables 1 and 2.

(Evaluation)

The chlorinated polyvinyl chloride resins obtained in the examples and the comparative examples were evaluated as follows. Tables 1 and 2 show the results.

(1) Measurement of the Amount of Added Chlorine

The amount of added chlorine was measured for each of the obtained chlorinated polyvinyl chloride resins in conformity with JIS K 7229.

(2) Molecular Structure Analysis

The molecular structure of each of the obtained chlorinated polyvinyl chloride resins was analyzed in conformity with the NMR measurement method described in R. A. Komoroski, R. G. Parker, J. P. Shocker, Macromolecules, 1985, 18, 1257-1265 so as to determine the amount of the structural units (a), (b), and (c).

The NMR measurement conditions were as follows.
Apparatus: FT-NMRJEOLJNM-AL-300
Measured nuclei: 13C (proton complete decoupling)
Pulse width: 90°
PD: 2.4 sec
Solvent: o-dichlorobenzene:deuterated benzene (C5D5)=3:1
Sample concentration: about 20%
Temperature: 110° C.
Reference material: central signal for benzene set to 128 ppm
Number of scans: 20,000

(3) Raman Spectroscopic Analysis (3-1) Raman Imaging Measurement

Each of the obtained powdery chlorinated polyvinyl chloride resins was molded into a sheet shape using a vacuum press (produced by Meiki Co., Ltd., MHPC-VF) to prepare a resin sheet having a thickness of 0.5 mm. Here, for pressurization, the vacuum press was set at 180° C. The powdery chlorinated polyvinyl chloride resin was set in the vacuum press and the air was evacuated over one minute. At this time, evacuation needs to be performed from atmospheric pressure to 10 hPa within 30 seconds, because exposure to oxygen during heating causes oxidation or dehydrochlorination. Molding was then performed at a pressure of 3 MPa, a pressure-increase time of 30 seconds, and a dwell time of 1 minute, and the pressure was rapidly decreased to atmospheric pressure, followed by cooling. Thus, the resin sheet was prepared.

The obtained resin sheet was then cut using a microtome. The obtained cross section was subjected to Raman spectroscopic measurement using a micro-Raman spectrometer (produced by Nanophoton Corporation, RAMANtouch).

The Raman spectroscopic measurement was performed under the conditions of an objective lens magnification of 20× and an excitation wavelength of 532 nm in a region of 400 μm×100 μm at 1-μm intervals in the x direction and 2-μm intervals in the y direction. Raman spectra of 20,000 points of the cross section of the resin sheet were thus obtained.

The obtained Raman spectra were baseline-corrected by linear approximation using a baseline from 400 $cm^{-1}$ to 850 $cm^{-1}$, and the peak intensity B observed in the range of 600 to 650 $cm^{-1}$ and the peak intensity A observed in the range of 660 to 700 $cm^{-1}$ were measured. Thereafter, the ratio (A/B) of the peak intensity A to the peak intensity B was calculated, and the average of the A/B was calculated.

(3-2) Raman Spectroscopy

Raman spectra of the obtained chlorinated polyvinyl chloride resins were measured using a micro-Raman spectrometer (produced by Thermo Fisher Scientific K.K., Almega XR). Here, the Raman spectra were measured for randomly collected 50 particles of each of the obtained powdery chlorinated polyvinyl chloride resins using a laser with a wavelength of 532 nm at an exposure time of 1 second and a scan number of 32. Raman spectroscopic analysis of particles themselves allows for obtaining the peak intensities of the particle surfaces. The wavenumbers of the Raman shifts were calibrated with the metal silicon peak at 520.5 $cm^{-1}$.

The obtained Raman spectra were baseline-corrected by linear approximation using a baseline from 515 $cm^{-1}$ to 950 $cm^{-1}$. The peak intensity B observed in the range of 600 to 650 $cm^{-1}$ (mainly 641 $cm^{-1}$) and the peak intensity A observed in the range of 660 to 700 $cm^{-1}$ (mainly 697 $cm^{-1}$) were measured. The ratio (A/B) of the peak intensity A to the peak intensity B was then calculated, and the average of the A/B of the 50 particles and the standard deviation of the A/B were calculated.

(4) Developed Interfacial Area Ratio (Sdr)

(Production of chlorinated polyvinyl chloride resin composition)

An amount of 5.5 parts by mass of an impact resistance modifier was added to 100 parts by mass of each of the obtained chlorinated polyvinyl chloride resins. Then, 1.5 parts by mass of a thermal stabilizer was added and mixed. The impact resistance modifier used was Kane Ace B-564 (produced by Kaneka Corporation, methyl methacrylate-butadiene-styrene copolymer). The thermal stabilizer used was TVS*1380 (produced by Nitto Kasei Co., Ltd., organotin stabilizer).

Further, 2.0 parts by mass of a polyethylene lubricant (produced by Mitsui Chemicals, Inc., Hiwax 220MP) and 0.3 parts by mass of a fatty acid ester lubricant (produced by Emery Oleochemicals Japan Ltd., LOXIOL G-32) were added. They were uniformly mixed in a super mixer, whereby a chlorinated polyvinyl chloride resin composition was obtained.

(Production of Extrusion-Molded Article)

The obtained chlorinated polyvinyl chloride resin composition was fed into a twin-screw counter-rotating conical extruder with a diameter of 50 mm (produced by Osada Seisakusho, SLM-50) to prepare a sheet-shaped molded article with a thickness of 2 mm and a width of 80 mm at a resin temperature of 207° C., a back pressure of 150 kg/cm$^2$, and an extrusion amount of 40 kg/hr.

(Sdr Measurement)

The Sdr value of a surface of the obtained molded article was measured using a 3D measurement system (produced by Keyence Corporation, VR-3100). Each Sdr value shown in Tables 1 and 2 is the average of five measurement regions.

Sdr is a ratio representing the degree of increase in the surface area of the measured region compared to the area of the measured region. A completely level surface has an Sdr of 0. A molded article having a low Sdr has excellent smoothness. Using such a molded article as, for example, a pipe-shaped molded article for plumbing or the like can reduce noise when water is running.

(5) Scorch Marks (Discoloration) of Molded Article

The surface state of the obtained molded article was visually examined and evaluated in accordance with the following criteria.
- ○ (Good): No scorch mark (discoloration) was observed.
- x (Poor): Scorch mark(s) (discoloration) was/were observed.

(6) Surface Shape (Unevenness)

The surface shape of the molded article was examined visually and by touch, and evaluated in accordance with the following criteria.
- ○ (Good): Neither the visual examination nor the touch examination found surface irregularities.
- Δ (Fair): The visual examination found no surface irregularities but the touch examination found surface irregularities.
- x (Poor) The visual examination found surface irregularities.

(7) Continuous Productivity

The obtained chlorinated polyvinyl chloride resin composition was fed into a twin-screw counter-rotating conical extruder with a diameter of 50 mm (produced by Osada Seisakusho, "SLM-50") to prepare sheet-shaped molded articles with a thickness of 2 mm and a width of 80 mm at a resin temperature of 207° C., a back pressure of 150 kg/cm$^2$, and an extrusion amount of 40 kg/hr. The time from the start of the molding to the occurrence of a scorch mark (discoloration) in the obtained molded article was measured, and the continuous productivity was evaluated.

A longer time before the occurrence of a scorch mark (discoloration) in the molded article indicates that the chlorinated polyvinyl chloride resin is less likely to contaminate the die surface and enables excellent continuous productivity when products are continuously produced by repeating similar operations for a long time.

(8) Color Tone

An amount of 100 parts by mass of each of the obtained chlorinated polyvinyl chloride resins was mixed with 1.5 parts by mass of a thermal stabilizer, 0.5 parts by mass of a lubricant, and 10 parts by mass of an impact resistance modifier. The thermal stabilizer used was TVS*1380 (produced by Nitto Kasei Co., Ltd., organotin stabilizer). The lubricant used included 0.435 parts by mass of a polyethylene lubricant (produced by Mitsui Chemicals, Inc., Hiwax 220MP) and 0.065 parts by mass of a fatty acid ester lubricant (produced by Emery Oleochemicals Japan Ltd., LOXIOL G-32). The impact resistance modifier used was Kane Ace B-564 (produced by Kaneka Corporation, methyl methacrylate-butadiene-styrene copolymer).

The obtained mixture was supplied to two 8-inch rolls, kneaded at 200° C. for three minutes, and formed into sheets each having a thickness of 1.0 mm. The obtained sheets were stacked, pre-heated using a press at 185° C. for three minutes, and pressurized for seven minutes, whereby a press plate having a thickness of 2 mm was obtained. The obtained press plate was mechanically processed to cut out a test specimen (15 mm×15 mm×2 mm) therefrom. The YI value of this test specimen was measured using a colorimeter (NR-3000, produced by Nippon Denshoku Industries Co., Ltd.).

TABLE 1

| Production method | | | | | Examples | | | | | | | | | | | |
|---|---|---|---|---|---|---|---|---|---|---|---|---|---|---|---|---|
| | | | | | 1 | 2 | 3 | 4 | 5 | 6 | 7 | 8 | 9 | 10 | 11 | 12 |
| Reaction vessel | Volume | | L | 300 | 300 | 300 | 300 | 300 | 300 | 300 | 300 | 300 | 300 | 300 | 300 |
| Raw material | Average degree of polymerization | | | 1000 | 1000 | 1000 | 1000 | 1000 | 1000 | 1000 | 1000 | 350 | 450 | 1900 | 2100 |
| PVC | Charge amount | | kg | 50 | 50 | 50 | 50 | 50 | 50 | 50 | 50 | 50 | 50 | 50 | 50 |
| Water | Ion-exchanged water | | kg | 130 | 130 | 130 | 130 | 130 | 130 | 130 | 130 | 130 | 130 | 130 | 130 |
| Chlorination conditions | Reaction temperature | | °C. | 100 | 70 | 100 | 100 | 100 | 100 | 100 | 100 | 100 | 100 | 100 | 100 |
| | Reaction pressure | | Mpa | 0.40 | 0.04 | 0.40 | 0.40 | 0.40 | 0.40 | 0.40 | 0.40 | 0.40 | 0.40 | 0.40 | 0.40 |
| | PVC + water | | kg | 180 | 180 | 180 | 180 | 180 | 180 | 180 | 180 | 180 | 180 | 180 | 180 |
| | Vortex volume in stirring | | L | 8.1 | 2.2 | 2.2 | 3.4 | 10.4 | 22.1 | 15.3 | 17.6 | 13.5 | 8.8 | 20.2 | 19.4 |
| | (Distance from liquid surface to stirring blade)/Height of liquid surface | | m/m | 0.386 | 0.133 | 0.131 | 0.211 | 0.421 | 0.538 | 0.444 | 0.56 | 0.438 | 0.399 | 0.489 | 0.477 |
| | Vortex volume/(PVC + water) | | L/kg | 0.045 | 0.012 | 0.012 | 0.019 | 0.058 | 0.123 | 0.085 | 0.098 | 0.075 | 0.049 | 0.112 | 0.108 |
| | (PVC + water)/Reaction vessel volume | | kg/L | 0.600 | 0.600 | 0.600 | 0.600 | 0.600 | 0.600 | 0.600 | 0.600 | 0.600 | 0.600 | 0.600 | 0.600 |
| | Average chlorine consumption rate | | kg/pvc · kg · 5 min | 0.02 | 0.02 | 0.015 | 0.018 | 0.04 | 0.05 | 0.038 | 0.045 | 0.02 | 0045 | 0.035 | 0.038 |
| | 200 ppm hydrogen peroxide | | ppm/hr | 15 | — | 20 | 55 | 35 | 40 | 45 | 10 | 150 | 25 | 35 | 15 |
| | UV wavelength | | nm | — | 365 | — | — | — | — | — | — | — | — | — | — |
| Chlorinated polyvinyl chloride resin | Amount of added chlorine | | mass % | 10.6 | 10.6 | 3.5 | 8.0 | 12.2 | 15.1 | 10.4 | 10.4 | 10.4 | 11.1 | 8.5 | 8.6 |
| | Structure | Structural unit (a) —CH$_2$—CHCl— | mol % | 36.4 | 36.3 | 80.0 | 52.2 | 26.5 | 9.0 | 38.1 | 38.0 | 37.6 | 33.5 | 49.5 | 48.9 |
| | | Structural unit (b) —CH$_2$—CCl$_2$— | mol % | 24.1 | 23.9 | 9.4 | 18.1 | 28.9 | 39.2 | 24.4 | 22.1 | 23.2 | 36.4 | 20.5 | 25.0 |
| | | Structural unit (c) —CHCl—CHCl— | mol % | 39.5 | 39.8 | 10.6 | 29.7 | 44.6 | 51.8 | 7.5 | 39.9 | 39.2 | 40.1 | 30.0 | 26.1 |
| | Raman spectroscopic analysis | Peak intensity A/B | Average | 1.370 | 1.310 | 0.550 | 1.262 | 1.710 | 1.820 | 1.401 | 1.401 | 1.122 | 1.632 | 1.636 | 1.718 |
| | | | Standard deviation | 0.038 | 0.098 | 0.090 | 0.006 | 0.022 | 0.088 | 0.004 | 0.013 | 0.004 | 0.012 | 0.092 | 0.003 |
| Molded article | (Peak average of NB) + (Standard deviation)$^{1/2}$ | | | 0.0012 | 0.0002 | 0.0010 | 0.0015 | 0.0018 | 0.0028 | 0.0015 | 0.0017 | 0.0014 | 0.0025 | 0.0023 | 0.0019 |
| | Sdr | | | ○ | ○ | ○ | ○ | ○ | ○ | ○ | ○ | ○ | ○ | ○ | ○ |
| | Scorch mark (discoloration) | | | ○ | ○ | ○ | ○ | ○ | ○ | ○ | ○ | ○ | ○ | ○ | ○ |
| | Surface shape (unevenness) | | | 7.3 | 12.3 | 6.3 | 4.6 | 5.3 | 4.8 | 6.8 | 4.8 | 3.8 | 4.9 | 6.21 | 3.9 |
| | Continuous productivity (hr) | | | 74.4 | 78.0 | 57.4 | 68.8 | 78.8 | 80.4 | 75.2 | 76.3 | 77.2 | 75.9 | 78.4 | 74.9 |
| | Color tone | | | 3.84.9 | | | | | | | | | | | |

TABLE 2

| Production method | | | | Examples | | | | | | Comparative Examples | | | | | | | |
|---|---|---|---|---|---|---|---|---|---|---|---|---|---|---|---|---|---|
| | | | | 13 | 14 | 15 | 16 | 17 | 1 | 2 | 3 | 4 | 5 | 6 | 7 |
| Reaction vessel | | Volume | L | 300 | 200 | 600 | 300 | 300 | 300 | 300 | 300 | 300 | 300 | 300 | 300 |
| Raw material | PVC | Average degree of polymerization | | 1000 | 1000 | 1000 | 1000 | 1000 | 1000 | 1000 | 1000 | 1000 | 1000 | 1000 | 1000 |
| | | Charge amount | kg | 50 | 30 | 60 | 41.7 | 57.5 | 50 | 50 | 66.7 | 37.5 | 50 | 37.5 | 62.5 |
| | Water | Ion-exchanged water | kg | 130 | 105 | 270 | 108.3 | 149.5 | 130 | 130 | 173.3 | 97.5 | 130 | 97.5 | 162.5 |
| | Chlorination conditions | Reaction temperature | °C. | 100 | 100 | 100 | 100 | 100 | 140 | 80 | 100 | 100 | 100 | 100 | 100 |
| | | Reaction pressure | Mpa | 0.40 | 0.40 | 0.40 | 0.40 | 0.40 | 0.40 | 0.40 | 0.40 | 0.40 | 0.40 | 0.40 | 0.40 |
| | | PVC + water | kg | 180 | 135 | 330 | 150 | 207 | 180 | 180 | 240 | 135 | 180 | 135 | 225 |
| | | Vortex volume in stirring | L | 25.2 | 11.1 | 25.7 | 13.4 | 19.0 | 32.5 | 1.2 | 37.4 | 0.8 | 27.0 | 12.2 | 27.0 |
| | | (Distance from liquid surface to/m stirring blade)/Height of liquid surface | | 0.673 | 0.442 | 0.440 | 0.446 | 0.449 | 0.960 | 0.057 | 0.886 | 0.040 | 0.795 | 0.447 | 0.522 |
| | | Vortex volume/(PVC +water) | L/kg | 0.140 | 0.082 | 0.078 | 0.089 | 0.092 | 0.181 | 0.007 | 0.156 | 0.006 | 0.150 | 0.090 | 0.120 |
| | | (PVC + water)/ Reaction vessel volume | kg/L | 0.600 | 0.675 | 0.550 | 0.500 | 0.690 | 0.600 | 0.600 | 0.800 | 0.450 | 0.600 | 0.450 | 0.750 |
| | | Average chlorine consumption rate | kg/pvc · kg · 5 min | 0.042 | 0.056 | 0.037 | 0.025 | 0.035 | 0.05 | 0.01 | 0.07 | 0.02 | 0.056 | 0.062 | 0.03 |
| | | 200 ppm hydrogen peroxide rate | ppm/hr | 200 | 80 | 45 | 10 | 30 | 50 | 50 | 100 | 120 | 50 | 20 | 45 |
| | | UV wavelength | nm | — | — | — | — | — | — | — | — | — | — | — | — |
| Chlorinated polyvinyl chloride resin | | Amount of added chlorine | mass % | 10.4 | 10.9 | 10.2 | 8.7 | 8.9 | 15.6 | 2.3 | 15.6 | 3.2 | 15.6 | 15.9 | 15.5 |
| | Structure | Structural unit (a) —CH$_2$—CHCl— | mol % | 37.6 | 35.2 | 39.2 | 48.3 | 47.2 | 5.8 | 87.3 | 5.8 | 82 | 5.8 | 4.1 | 6.7 |
| | | Structural unit (b) —CH$_2$—CCl$_2$— | mol % | 24.7 | 25.9 | 24.1 | 21.3 | 22.8 | 38.7 | 5.9 | 52.3 | 9.2 | 45.2 | 55.5 | 46.2 |
| | | Structural unit (c) —CHCl—CHCl— | mol % | 37.7 | 39.0 | 36.7 | 30.4 | 30.0 | 55.5 | 6.8 | 41.9 | 8.8 | 49.0 | 40.4 | 47.1 |
| | Raman spectroscopic analysis | Peak intensity A/B | Average | 1.401 | 1.430 | 1.390 | 1.303 | 1.314 | 2.050 | 0.390 | 2.050 | 0.425 | 2.040 | 2.058 | 2.046 |
| | | | Standard deviation | 0.004 | 0.008 | 0.003 | 0.002 | 0.002 | 0.072 | 0.011 | 0.103 | 0.005 | 0.103 | 0.113 | 0.103 |
| | | (Peak average of NB) + (Standard deviation)$^{1/2}$ | | 1.465 | 1.517 | 1.446 | 1.350 | 1.355 | 2.318 | 0.495 | 2.371 | 0.496 | 2.361 | 2.394 | 2.367 |
| Molded article | | Sdr | | 0.0020 | 0.0017 | 0.0010 | 0.0002 | 0.0002 | 0.0130 | 0.0001 | 0.0123 | 0.0009 | 0.0115 | 0.0117 | 0.012 |
| | | Scorch mark (discoloration) | | ○ | ○ | ○ | ○ | ○ | x | x | x | x | x | x | x |
| | | Surface shape (unevenness) | | ○ | ○ | ○ | ○ | ○ | x | ○ | x | ○ | x | x | x |
| | | Continuous productivity (hr) | | 8.9 | 6.5 | 6.8 | 3.9 | 6.3 | 2.6 | 0.6 | 0.2 | 0.5 | 1.9 | 0.9 | 2.5 |
| | | Color tone | | 75.9 | 75.2 | 76.2 | 76.2 | 76.4 | 79.8 | 49.4 | 88.0 | 58.1 | 81.0 | 80.5 | 78.5 |

INDUSTRIAL APPLICABILITY

The present invention can provide a chlorinated polyvinyl chloride resin that enables excellent continuous productivity in molding and that enables a molded article to have both processability and unevenness-preventing properties.

The invention claimed is:

1. A chlorinated polyvinyl chloride resin having an average of a ratio (A/B) of a peak intensity A observed in a range of 660 to 700 cm$^{-1}$ to a peak intensity B observed in a range of 600 to 650 cm$^{-1}$ of 0.50 to 2.00 in Raman imaging measurement by Raman spectroscopy.

2. The chlorinated polyvinyl chloride resin according to claim 1,
wherein a standard deviation of the ratio (A/B) of the peak intensity A to the peak intensity B is lower than 0.100 in Raman measurement by Raman spectroscopy.

3. The chlorinated polyvinyl chloride resin according to claim 2,
wherein the average of the A/B and the standard deviation of the A/B satisfy the following relation (1):

$$0.500 \leq [\text{Average of } A/B] + [\text{Standard deviation of } A/B]^{1/2} \leq 2.300 \quad (1).$$

4. A resin composition for molding comprising the chlorinated polyvinyl chloride resin according to claim 1.

5. A molded article molded from the resin composition for molding according to claim 4.

6. A resin composition for molding comprising the chlorinated polyvinyl chloride resin according to claim 2.

7. A resin composition for molding comprising the chlorinated polyvinyl chloride resin according to claim 3.

8. A molded article molded from the resin composition for molding according to claim 6.

9. A molded article molded from the resin composition for molding according to claim 7.

10. The chlorinated polyvinyl chloride resin according to claim 1,
wherein the chlorinated polyvinyl chloride resin contains units (a) to (c) represented by the following formulas (a) to (c), and a proportion of the structural unit (a) is 5.0 mol % or higher, a proportion of the structural unit (b) is 40.0 mol % or lower, and a proportion of the structural unit (c) is 55.0 mol % or lower, relative to a total number of moles of the structural units (a), (b), and (c)

—CH$_2$—CHCl—                                                                               (a)

—CH$_2$—CCl$_2$—                                                                              (b)

—CHCl—CHCl—                                                          (c)

11. The chlorinated polyvinyl chloride resin according to claim 1,
wherein the chlorinated polyvinyl chloride resin contains units (a) to (c) represented by the following formulas (a) to (c), a proportion of the structural unit (a) is 5.0 mol % or higher and 90.0 mol % or lower, a proportion of the structural unit (b) is 5.0 mol % or higher and 40.0 mol % or lower, and a proportion of the structural unit (c) is 5.0 mol % or higher and 55.0 mol % or lower, relative to a total number of moles of the structural units (a), (b), and (c)

—CH$_2$—CHCl—                                                           (a)

—CH$_2$—CCl$_2$—                                                       (b)

—CHCl—CHCl—                                              (c)

12. The chlorinated polyvinyl chloride resin according to claim 1,
wherein an amount of added chlorine is 3.3 to 15.3% by mass.

* * * * *